(No Model.) 4 Sheets—Sheet 1.
E. W. THOMPSON & L. W. HASKELL.
GIN SAW GUMMER.

No. 406,315. Patented July 2, 1889.

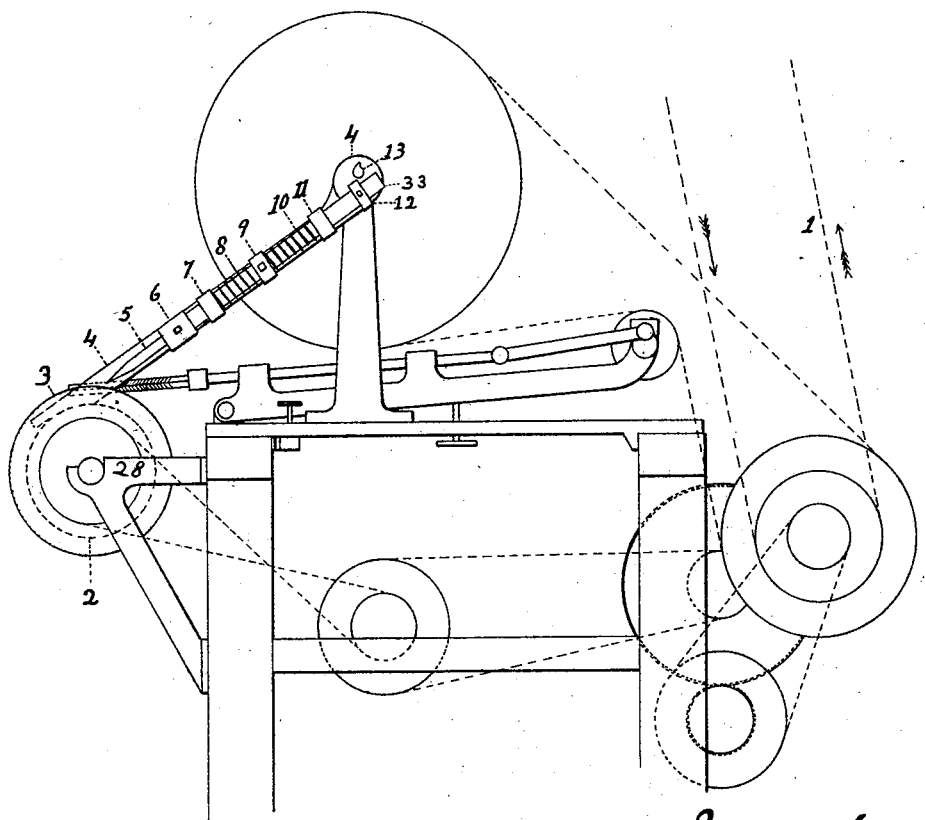

(No Model.) 4 Sheets—Sheet 3.

E. W. THOMPSON & L. W. HASKELL.
GIN SAW GUMMER.

No. 406,315. Patented July 2, 1889.

(No Model.) 4 Sheets—Sheet 4.

E. W. THOMPSON & L. W. HASKELL.
GIN SAW GUMMER.

No. 406,315. Patented July 2, 1889.

UNITED STATES PATENT OFFICE.

ERWIN WILLIAM THOMPSON, OF COLUMBIA, SOUTH CAROLINA, AND LOUIS WARDLAW HASKELL, OF SAVANNAH, GEORGIA.

GIN-SAW GUMMER.

SPECIFICATION forming part of Letters Patent No. 406,315, dated July 2, 1889.

Application filed March 1, 1889. Serial No. 301,709. (No model.)

*To all whom it may concern:*

Be it known that we, ERWIN WILLIAM THOMPSON and LOUIS WARDLAW HASKELL, citizens of the United States, and residents of Columbia, in the county of Richland and State of South Carolina, and Savannah, in the county of Chatham, in the State of Georgia, respectively, have invented a new and useful Gin-Saw Gummer, of which the following is a specification.

Our invention relates to improvements in gin-saw gummers in which a chisel or chisels are caused to strike the edge of the saw at the bottom of each tooth; and the objects of our invention are, first, to provide a guide for the chisel; second, to provide a chuck or seat for the chisel which may be adjusted to an angle suited to the size of the saw being gummed; third, to provide a suitable bed, on which moves a carriage which sustains a set of guides for the moving chisel; fourth, to provide suitable bearings in which the journals of the gang of saws may rest while being gummed; fifth, to provide a positive-feed arrangement to revolve the saws, so that the chisel may strike but once at the root of each tooth. We attain these objects by means of the mechanism illustrated in the accompanying drawings, in which—

Figure 1 is a detail elevation of the mechanism. Fig. 2 is a plan of the same. Fig. 3 illustrates the application of the mechanism to a Carver cotton-gin-saw filer; Fig. 4, a plan of the machine with saw-gummers, feed mechanism, and gang of saws in place ready to be sharpened.

Similar figures refer to similar parts in all the drawings.

In Figs. 1, 2, and 3, 3 is the roll or gang of saws, revolved in temporary bearings 28 by a belt. 5 is the chisel, which is held in the socket or chuck 16 and 17 by the set-screw 16. The socket may be adjusted to a certain extent, as it is held firmly to the rod 33 by the bolt 18, which may be slackened and the chisel and its holder set to correspond with the pitch of the saw-teeth.

7 and 11 are guides fastened to the frame 4.

9 is an adjustable block, which may be moved along the rod 33 and set by a screw. 9 is flattened on one side, and its contact with 4 prevents the rod and chisel from turning about its longitudinal axis.

8 is a light spring abutting against the guides 7 and the block 9. Its use is to cause the chisel 5 to rebound after it has struck a blow. The striking motion is produced by the heavy spring 10, which also abuts against the block 9 and the guide 11.

12 is an adjustable block, against which the cam 13 impinges at each revolution of the spindle 14, Fig. 2.

15 is simply a cam-thimble made fast to the spindle. It carries the cam 13 on its face.

The supporting-bar 4 for the guides 7 and 11 is supported at one end by the spindle, the bar having a running fit on the spindle. The other end of the bar rests on the core of the revolving gang or roll and sets down between the saws. This end is raised or lowered to conform to the size of the core by the screw 19, which is passed through the bar near its end. It has a shoe which bears on the core of the roll or gang.

In practice the action of the machine is as follows: The spindle 14 is revolved. The cam 13, being fast, turns also, and at each revolution presses the block 12 and rod 33 upward against the pressure of the spring 10. As the spindle revolves, the cam releases the block 12, and the elasticity of the spring 10 forces the chisel, chuck, and rod all downward. After the chisel has delivered its blow the spring 8 causes it to rebound just enough to clear the revolving saw. This action is repeated as many times as is necessary to gum one saw, when the entire mechanism is moved along to the next saw.

Figure 2:
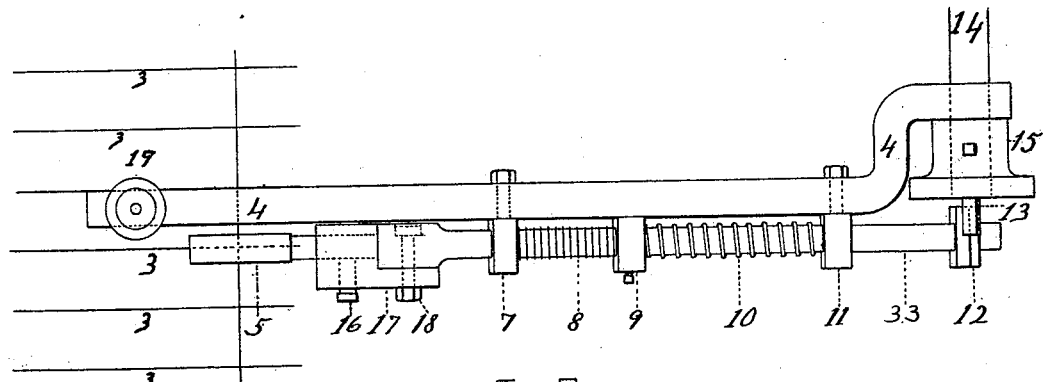
Figure 1:
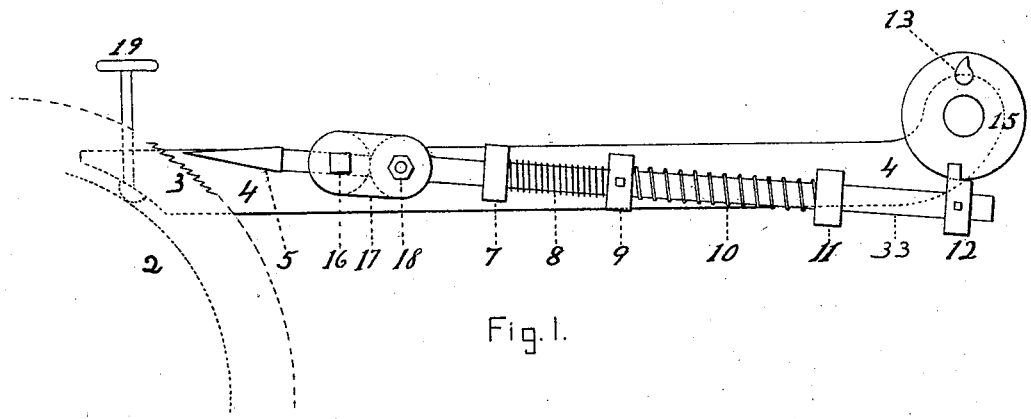

The frame of the machine 30 has a rack 36, which is in gear with a pinion and hand-wheel 35, which may be used to cause the carriages 39 and 40 to travel along the bed and so reach any saw of the gang. A shaft 20, with a feather its entire length, is supported at the ends of the frame and revolved by a belt on the pulley 21.

Figure 5:
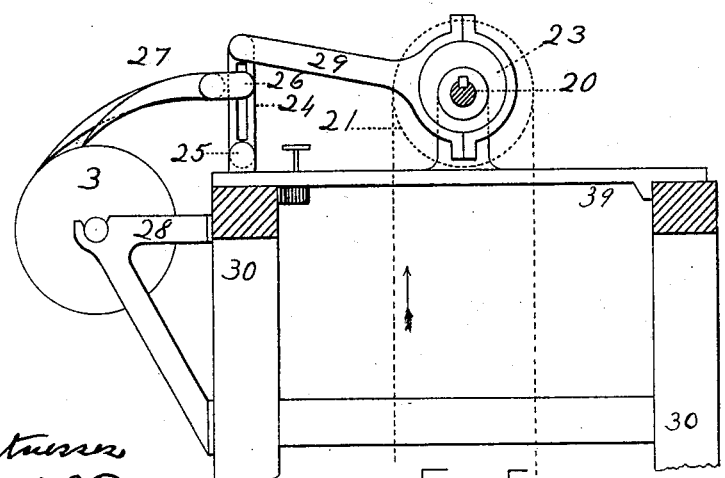
Fig. 5 represents an elevation of the feed arrangement, both 5 and 6 being used as shown in the machine, Fig. 4.

The gang of saws revolves in the temporary bearings 28. It is moved by the device shown in Fig. 5, in which 3 is the gang.

27 is a set of pawls which drop into the teeth of a saw. These pawls are held by the link-block 26, which may be adjusted in the link 24 to give more or less motion to the roll. The link 24 is supported between two lugs 25, (part of the carriage,) and at the opposite end is fastened the eccentric-rod 29.

The eccentric is placed loosely on the shaft 20, and is held in place by two lugs, through which the shaft passes. As the shaft turns, the feather engages the eccentric 23 and gives motion to the link and pawls which revolve the roll or gang of saws.

The entire carriage 39 may be moved by the rack and pinion 35, so the pawls may engage the best saw in the roll, which thus acts as a templet for the time being.

Figure 6:
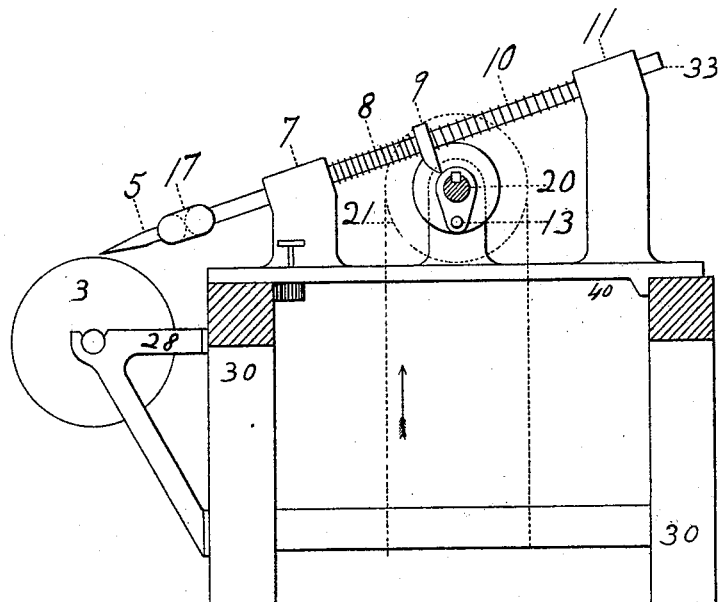
Fig. 6 shows a detail elevation of that mechanism.

In Fig. 6 are shown the details of the chisel mechanism. As before, the feather in the shaft causes the crank-cam 13 to revolve. It lifts the chisel-holder by pressure against the block 9 against the pressure of the spring 10. At a certain point of the revolution the cam releases the block, and the spring 10 forces the chisel-rod 33 down until the chisel 5 delivers a blow, when the light spring 8 causes it to rebound to clear the tooth of the saw.

Figure 4:
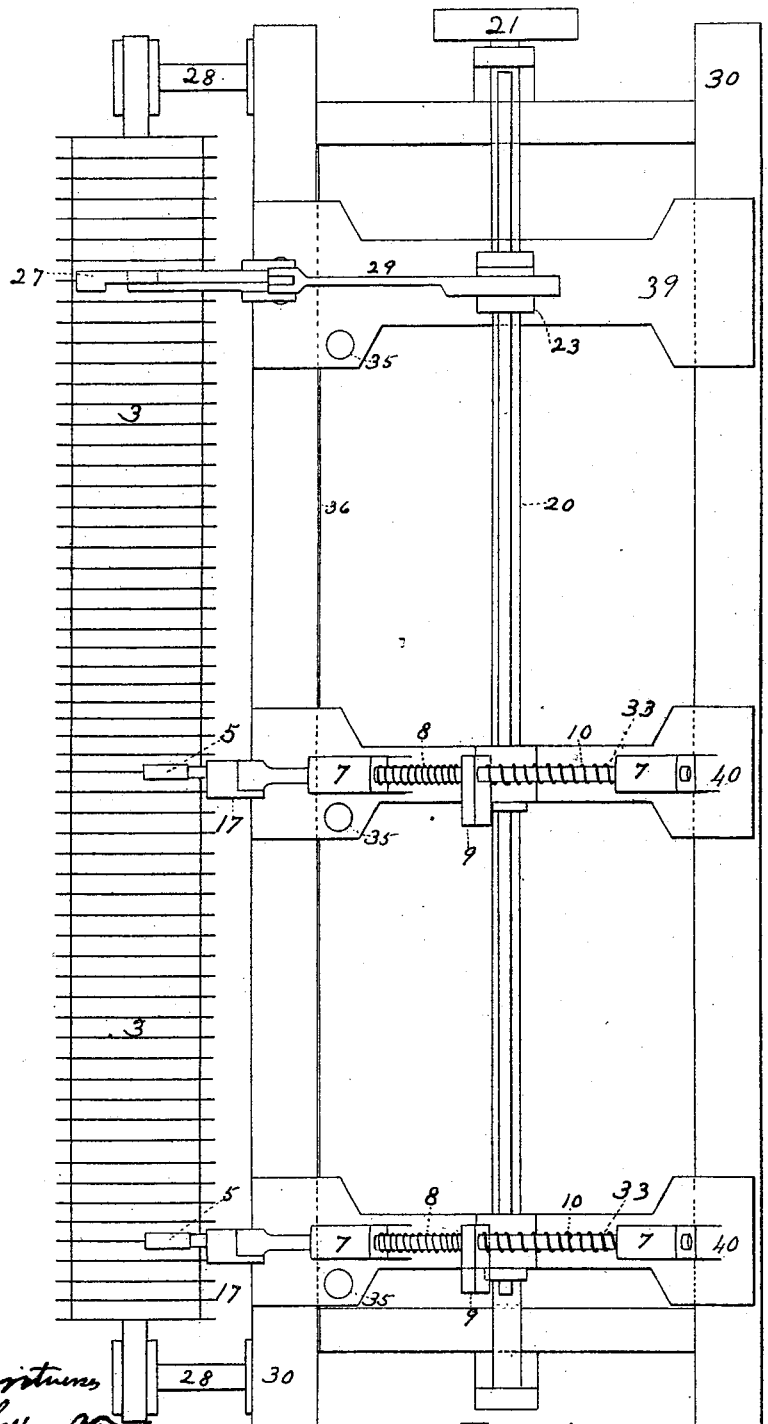

In this case the guides 7 and 11 are moved by the carriage 40 and are part of it. The carriage may be shifted to any part of the bed by means of the rack and pinion and hand-wheel 35, Fig. 4.

We claim herein as our invention and desire to secure by Letters Patent—

1. The combination of a frame having temporary bearings in which the shaft of a gang or roll of saws revolves and an adjustable chisel which is caused to indent the root of each saw-tooth in succession, substantially as shown, for the purpose specified.

2. The combination of a frame having bearings in which the shaft of a gang or roll of saws revolves while being gummed and an adjustable chisel which is caused to indent the root of each saw-tooth by means of a set of springs and crank arm or cam, substantially as shown, for the purpose specified.

3. The combination of a frame having bearings in which a roll or gang of saws revolves while being gummed and an adjustable chisel which is caused to indent the root of each saw-tooth in succession, with adjustable pawl or pawls, which act upon a saw other than the one being gummed to revolve the whole roll or gang, substantially as set forth, for the purpose specified.

ERWIN WILLIAM THOMPSON.
LOUIS WARDLAW HASKELL.

Witnesses:
WALTER S. TAYLOR,
JAMES PRICE.

Witnesses to signature of Louis Wardlaw Haskell:
SAML. B. ADAMS,
GEO. W. OWENS.